(12) United States Patent
Kim et al.

(10) Patent No.: US 11,486,757 B2
(45) Date of Patent: Nov. 1, 2022

(54) ULTRASONIC SENSOR, ULTRASONIC SENSING DEVICE AND DISPLAY DEVICE

(71) Applicant: LG Display Co., Ltd., Seoul (KR)

(72) Inventors: SeonYeong Kim, Seoul (KR); Sungjin Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 539 days.

(21) Appl. No.: 16/591,377

(22) Filed: Oct. 2, 2019

(65) Prior Publication Data
US 2020/0141793 A1 May 7, 2020

(30) Foreign Application Priority Data
Nov. 2, 2018 (KR) .......................... 10-2018-0133761

(51) Int. Cl.
*G01H 11/08* (2006.01)
*B06B 1/02* (2006.01)
*G01N 29/34* (2006.01)

(52) U.S. Cl.
CPC .......... *G01H 11/08* (2013.01); *B06B 1/0207* (2013.01); *G01N 29/34* (2013.01)

(58) Field of Classification Search
CPC ..... G01H 11/08; B06B 1/0207; B06B 1/0215; B06B 1/0622; G01N 29/34; G06V 40/1306; G09G 3/006; G09G 2380/08; G06F 3/043; G06F 3/0412; G06F 3/04166; G06F 2203/04104; G06F 2203/04106
See application file for complete search history.

(56) References Cited

U.S. PATENT DOCUMENTS

| 7,884,810 B2 | 2/2011 | Jang et al. |
| 9,323,393 B2 | 4/2016 | Djordjev et al. |
| 10,966,682 B2 | 4/2021 | Maruyama et al. |
| 11,107,969 B2 * | 8/2021 | Iwazaki ................. H01L 41/25 |

(Continued)

FOREIGN PATENT DOCUMENTS

| JP | 2017034784 A | 2/2017 |
| JP | 2017085257 A | 5/2017 |

(Continued)

OTHER PUBLICATIONS

Korean Office Action, Korean Intellectual Property Office Patent Application No. 10-2018-0133761, dated Aug. 12, 2022, 19 pages.

*Primary Examiner* — Suman K Nath
(74) *Attorney, Agent, or Firm* — Fenwick & West LLP

(57) ABSTRACT

The present disclosure relates to ultrasonic sensors, ultrasonic sensing devices and display devices. The ultrasonic sensor includes an array of thin film transistors in which first electrodes are disposed, a piezoelectric material, and second electrodes. In order to generate ultrasonic waves and perform sensing, the second electrode is disposed in a patterned structure in which the second electrode is divided into multiple second electrodes, and a high voltage in the form of pulse is applied to the second electrode. Thus, in accordance with embodiments of the present disclosure, a high voltage is not applied to the array of thin film transistors; therefore, it is possible to reduce or overcome degradation of circuit elements disposed in the array of thin film transistors. Accordingly, it is possible to improve the reliability and lifetime of the circuit elements disposed in the array of thin film transistors, while performing sensing.

21 Claims, 12 Drawing Sheets

(56) References Cited

U.S. PATENT DOCUMENTS

| | | |
|---|---|---|
| 2007/0024546 A1 | 2/2007 | Jang et al. |
| 2009/0001853 A1* | 1/2009 | Adachi ................. B06B 1/0292 |
| | | 310/323.19 |
| 2014/0354596 A1 | 12/2014 | Djordjev et al. |
| 2017/0182773 A1* | 6/2017 | Fujisawa ................ B41J 2/0451 |
| 2018/0226561 A1 | 8/2018 | Iwazaki et al. |
| 2018/0310915 A1 | 11/2018 | Maruyama et al. |
| 2019/0065806 A1* | 2/2019 | Cheng ................... B06B 1/0207 |
| 2019/0291417 A1* | 9/2019 | Takagi ................. B41J 2/04581 |

FOREIGN PATENT DOCUMENTS

| | | |
|---|---|---|
| KR | 100552451 B1 | 2/2006 |
| KR | 1020160016969 A | 2/2015 |

\* cited by examiner

ULTRASONIC SENSOR, ULTRASONIC SENSING DEVICE AND DISPLAY DEVICE

CROSS-REFERENCE TO RELATED APPLICATION

This application claims the priority benefit of the Republic of Korean Patent Application No. 10-2018-0133761, filed on Nov. 2, 2018 in the Korean Intellectual Property Office, the disclosure of which is incorporated by reference in its entirety.

BACKGROUND

Field of the Disclosure

The present disclosure relates to ultrasonic sensors, ultrasonic sensing devices and ultrasonic display devices.

Description of the Background

As the information society has developed at a rapid rate, there is an increasing need for display devices employing advanced technologies and more efficient methods. Recently, various types of display devices, such as Liquid Crystal Display (LCD), Plasma Display Panel (PDP), and Organic Light Emitting Display (OLED) devices, have been developed and utilized.

In order to provide more various functions to a user, some touch sensing enabled display devices provide the function of detecting the touch of a user associated medium (e.g., a stylus pen or part of a user's body) on a display panel, or recognizing a part of the user's body (e.g., a fingerprint) contacting or approaching the display panel, and then performing an associated operation based on the detected or recognized information.

As one scenario to provide such a function, an optical sensor may be used to detect biometric information; however, when the optical sensor is disposed in the bezel area of the display panel, there is a problem that the active area become narrowed. Further, when the optical sensor is disposed inside of the display panel, there is a problem that it affects display driving or causes the accuracy of the sensing to be lowered.

In such a situation, there is a need for preventing the active area of the display panel from being reduced, and at the same time, improving the accuracy of sensing biometric information with respect on the display panel.

SUMMARY

Accordingly, the present disclosure is directed to ultrasonic sensors, ultrasonic sensing devices and ultrasonic display devices that substantially obviate one or more problems due to limitations and disadvantages of the prior art. It is at least one object of the present disclosure to provide an ultrasonic sensor, an ultrasonic sensing device, and a display device including the ultrasonic sensor and/or the ultrasonic sensing device, capable of recognizing user's biometric information contacting or approaching the display panel.

It is at least one object of the present disclosure to provide ultrasonic sensors and ultrasonic sensing devices capable of performing ultrasonic sensing and reducing the degradation of an array of thin film transistors of the ultrasonic sensor.

It is at least one object of the present disclosure to provide ultrasonic sensors and ultrasonic sensing devices capable of increasing an area for performing sensing in the array of thin film transistors of the ultrasonic sensor.

Some embodiments relate to an ultrasonic sensor that includes: an array of thin film transistors, a plurality of first electrodes, a piezoelectric material disposed over the array of thin film transistors, and a plurality of second electrodes disposed over the piezoelectric material. In the ultrasonic sensor, in a time interval, a first driving voltage is applied to at least one of the plurality of first electrodes and a second driving voltage is applied to at least one of the plurality of second electrodes. The second driving voltage may be an AC (Alternating Current) voltage with a maximum voltage that is greater than a maximum voltage of the first driving voltage.

In some embodiments, the first driving voltage is a substantially constant (e.g., a DC (Direct Current)) voltage.

In some embodiments, the thin film transistor array includes a plurality of scan lines, a plurality of sensing lines, and a plurality of pixels. The second electrodes are disposed in a direction in which the plurality of scan lines are disposed.

In some embodiments, the second driving voltage is sequentially supplied to the plurality of second electrodes.

In some embodiments, the ultrasonic sensor includes a controller directly electrically connected to the plurality of second electrodes or electrically connected to the plurality of second electrodes through a connection unit electrically separated from the array of thin film transistors. The plurality of second electrodes receives the second driving voltage from the controller. In some embodiments, the plurality of first electrodes receive the first driving voltage from a driving circuit separated from the controller.

In some embodiments, the plurality of second electrodes receive the second driving voltage from a controller electrically connected to the plurality of second electrodes through a pad disposed in the array of thin film transistors.

In some embodiments, the thin film transistor array includes a plurality of scan lines, a plurality of sensing lines, and a plurality of pixels. Each of the plurality of pixels includes a first transistor, a second transistor, and a third transistor. The first transistor, disposed in an N-th pixel column, is controlled by a scan signal applied to at least one of the plurality of scan lines, and connected between the at least one of the first electrodes and a first driving voltage line. The second transistor, disposed in an (N+1)th pixel column, is controlled by the scan signal applied to the at least one of the plurality of scan lines, and connected to at least one of the plurality of sensing lines. The third transistor is controlled by a voltage level of the at least one of the first electrodes, and connected between the second transistor and a sensing voltage line. The first transistor and the second transistor are driven by an identical scan line. In some embodiments, each of the plurality of second electrodes receives the second driving voltage in a time interval in which a scan signal with a level capable of turning on the at least one of the plurality of first electrodes is applied to the at least one of the plurality of scan lines corresponding to the at least one of the plurality of second electrodes. In some embodiments, the second electrodes disposed in the (N+1)th pixel column are turned on in a time interval in which the first transistor disposed in the N-th pixel column is turned on, and turned off in an interval in which the first transistor disposed in the N-th pixel column is turned off.

In some embodiments, the array of thin film transistors includes a plurality of scan lines, a plurality of sensing lines, and a plurality of pixels, and the ultrasonic sensor further includes, a scan driving circuit outputting one or more scan signals to the plurality of scan lines, and a sensing circuit detecting one or more sensing signals through the plurality of sensing lines.

In some embodiments, in a time interval in which the scan driving circuit outputs the scan signal to the at least one of the plurality of scan lines with a level capable of turning on transistors connected to the at least one of the plurality of scan lines, a controller outputs the second driving voltage to the at least one of the plurality of second electrodes corresponding to the at least one of the plurality of scan lines to which the scan signal is applied.

In some embodiments, a display device includes a display panel and the ultrasonic sensor.

Alternative embodiments relate to an ultrasonic sensor that includes thin film transistors (TFTs), first electrodes coupled to one or more of the TFTs, a piezoelectric material coupled to the first electrodes, and second electrodes coupled to the piezoelectric material and separated from the TFTs by at least the piezoelectric material. A first driving voltage is applied to at least one of the first electrodes through one or more of the TFTs and a second driving voltage is applied to at least one of the second electrodes. The second driving voltage has an amplitude larger than an amplitude of the first driving voltage.

In some embodiments, a pixel of the ultrasonic sensor includes a first transistor, a second transistor, and a third transistor. The first transistor is connected to a first electrode of the first electrodes and a driving voltage line. The first driving voltage is applied to the driving voltage line. The second transistor is connected to a sensing line. The third transistor is connected to the second transistor and a sensing voltage line. The gate electrode of the third transistor is electrically connected to the first electrode. A scanning line is electrically connected to a gate electrode of the first transistor and a gate electrode of another second transistor in an adjacent pixel of the ultrasonic sensor.

In some embodiments, the ultrasonic sensor further includes a driving circuit and a controller. The driving circuit applies the driving voltage to at least one of the first electrodes through one or more of the TFTs. The controller is physically distinct from the driving circuit and applies the second driving voltage to the at least one of the second electrodes, wherein the second driving voltage does not pass through the thin film transistors.

In some embodiments, the ultrasonic sensor includes an array of pixels. Each of the pixels includes one or more of the TFTs and one or more of the first electrodes. The second electrodes are aligned with pixel columns of the array of pixels. In accordance with embodiments of the present disclosure, ultrasonic waves are emitted from the piezoelectric material corresponding to a first pixel column of the pixel columns by applying the first driving voltage to one or more first electrodes in the first pixel column and applying the second driving voltage to one or more of the second electrodes aligned with the first pixel column. In accordance with embodiments of the present disclosure, while the piezoelectric material corresponding to the pixel column emits ultrasonic waves, the piezoelectric material in an adjacent pixel column detects ultrasonic waves. In accordance with embodiments of the present disclosure, a first portion of pixels in the adjacent column detect ultrasonic waves during a first period and a second portion of pixels in the adjacent column detect ultrasonic waves during a second period that is subsequent to the first period.

In some embodiments, the first driving voltage is a DC (Direct Current) voltage and the second driving voltage is an AC (Alternating Current) voltage.

In accordance with embodiments of the present disclosure, when an ultrasonic sensor performs sensing, a low voltage can be applied to an array of thin film transistors; therefore, it is possible to prevent the array of thin film transistors from being degraded, and thus to perform ultrasonic sensing without the degradation thereof.

In accordance with embodiments of the present disclosure, a second electrode forming a capacitance with a first electrode disposed in an array of thin film transistors of an ultrasonic sensor is patterned and disposed; therefore, sensing can be performed for each pixel column or pixel row of the array of thin film transistor.

In accordance with embodiments of the present disclosure, a controller supplying a high voltage to a second electrode of an ultrasonic sensor directly supplies a voltage to the second electrode without passing through the thin film transistor array; therefore, it is possible to increase a sensing area in the thin film transistor array.

Additional features and advantages of the disclosure will be set forth in the description which follows and in part will be apparent from the description, or may be learned by practice of the disclosure. The objectives and other advantages of the disclosure will be realized and attained by the structure particularly pointed out in the written description and claims hereof as well as the appended drawings.

DETAILED DESCRIPTION

Figure 1:
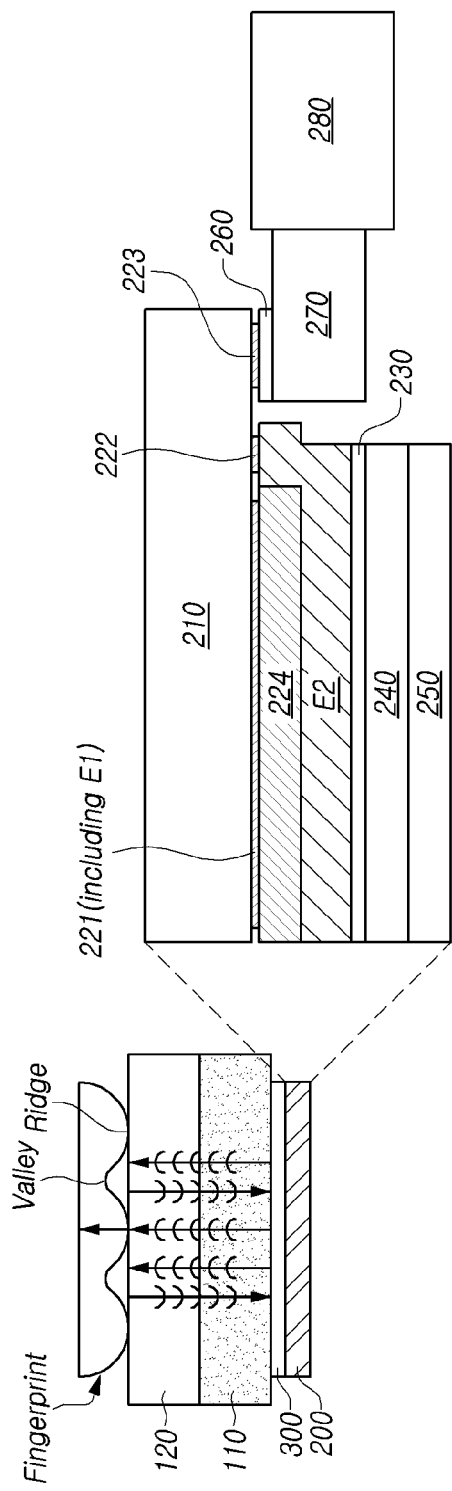
FIG. 1 is a diagram illustrating a structure in which an ultrasonic sensor is disposed in a display device according to an embodiment of the present disclosure.

Hereinafter, the present embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 1 is a diagram illustrating a structure in which an ultrasonic sensor 200 is disposed in a display device according to an embodiment of the present disclosure.

Referring to FIG. 1, a display device according to embodiments of the present disclosure can include a display panel 110 in which a plurality of gate lines, a plurality of data lines, and a plurality of subpixels are disposed, and several types of driving circuits for driving signal lines and voltage lines disposed in the display panel 110.

An ultrasonic sensor 200 or an ultrasonic sensing device for sensing biometric information (e.g., a fingerprint) contacting or approaching the display panel 110 can be disposed on at least one surface of the display device.

For example, the ultrasonic sensor 200 can be disposed on the opposite surface of an image-displaying surface of the display panel 110. The ultrasonic sensor 200 can be attached to the display panel 110 through an adhesive 300. The adhesive 300 can be, e.g., formed of resin.

The ultrasonic sensor 200 can generate ultrasonic waves, detect ultrasonic waves reflected from a fingerprint contacting cover glass 120, and then detect the fingerprint in contact with the cover glass 120.

Specifically, when the ultrasonic waves generated from the ultrasonic sensor 200 reach valleys of the fingerprint, the ultrasonic waves contact air existing between the cover glass 120 and the skin of the valleys. Here, most of the ultrasonic waves in contact with the air may be reflected due to a difference between the acoustic impedance of the cover glass 120 and the acoustic impedance of air.

Further, when the ultrasonic waves generated from the ultrasonic sensor 200 reach ridges of the fingerprint, the ultrasonic waves reach the skin of the fingerprint in contact with the cover glass 120. Here, some of ultrasonic waves having reached the skin of the ridges may be reflected, but most of the ultrasonic waves may travel up to the inside of the skin and then reflected from the inside area of the skin.

Accordingly, the ultrasonic sensor 200 can detect the fingerprint by distinguishing fingerprint features of the ridges and the valleys based on reception intensities or reception times (reception delays) of ultrasonic waves reflected after having reached the ridges and the valleys of the fingerprint.

Thus, since the ultrasonic sensor 200 uses a sensing scheme allowing an inside area of the skin to be sensed, it is not sensitive to the contamination or condition of the skin surface, and it is possible to provide high security related to the fingerprint corresponding to personal information. In addition, the display panel 110 enables the display device to detect a fingerprint without the reducing of an area in which an image is displayed.

The ultrasonic sensor 200 can include a material for generating ultrasonic waves, and several circuit elements for generating and sensing ultrasonic waves.

For example, the ultrasonic sensor 200 can include a substrate 210, an array of thin film transistors 221 disposed over the substrate 210, a first pad 222, and a second pad 223. The array of thin film transistors 221 can include a first electrode E1, and a piezoelectric material 224 and a second electrode E2 can be sequentially disposed on the array of thin film transistors 221.

The second electrode E2 can be adhered to a reflective layer 240 through an adhesive layer 230, and a passivation layer 250 can be disposed on the reflective layer 240.

A controller 280 supplying a signal, a voltage, or the like to the array of thin film transistors 221 and the second electrode E2, or the like can be electrically connected to a second pad 223 disposed on the substrate 210 through a flexible printed circuit 270 and a conductive bond 260.

Transistors for enabling ultrasonic waves to be generated and sensing ultrasonic waves reflected from a fingerprint, and the first electrode E1 for forming a capacitance can be disposed in the array of thin film transistors 221.

The first electrode E1 forming a capacitance is disposed in the array of thin film transistors 221, and the capacitor C can be formed between the first electrode E1 and the second electrode E2.

Further, the piezoelectric material 224 can vibrate by voltages applied to the first electrode E1 disposed in the array of thin film transistors 221 and the second electrode E2, and thus ultrasonic waves can be generated.

The array of thin film transistors 221 including the first electrode E1, piezoelectric material 224 and the second electrode E2 may be understood to constitute an array of pixels in a circuit.

The second electrode E2 can be disposed using a scheme of coating silver ink, or be disposed to cover the whole area of the piezoelectric material 224 or in a pre-configured pattern.

The reflective layer 240 can be formed of a metal, such as copper or the like, and can perform a function of reflecting ultrasonic waves reflected from a fingerprint to the array of thin film transistors 221.

The passivation layer 250 can be formed of polyimide, and can perform a function of capping the array of pixels and the reflective layer 240, and the like of the ultrasonic sensor 200.

A signal and a voltage for driving the array of pixels may be supplied from the controller 280. In some embodiments, a signal etc. not requiring a high voltage may be supplied from a driving circuit disposed for driving the display panel 110.

Hereinafter, a driving and sensing scheme of the ultrasonic sensor 200 will be discussed with reference to a circuit structure of the array of pixels.

Figure 2:
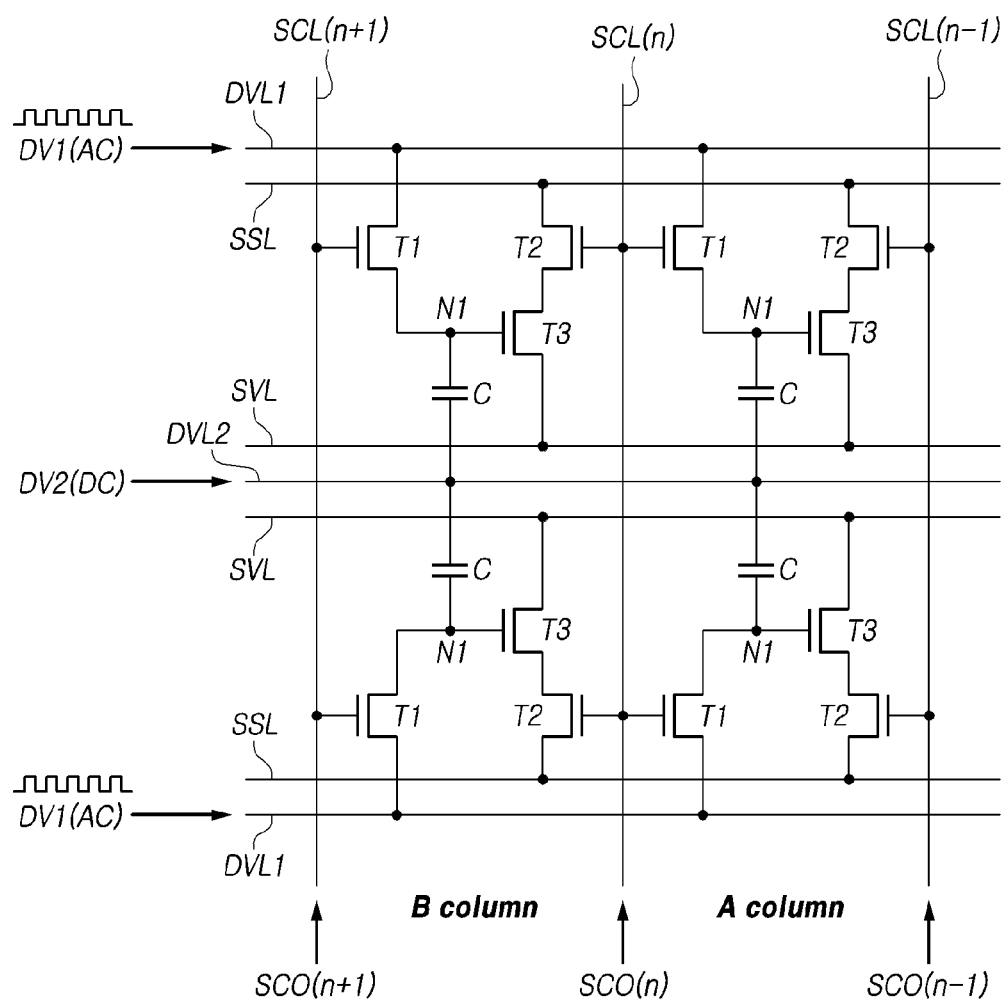
FIG. 2 is a diagram illustrating a circuit structure and a driving scheme of an array of pixels of the ultrasonic sensor according to an embodiment of the present disclosure.

FIG. 2 is a diagram illustrating of a circuit structure and a driving scheme of the array of pixels of the ultrasonic sensor 200 according to an embodiment of the present disclosure.

Referring to FIG. 2, a plurality of scan lines SCL and a plurality of sensing lines SSL can be disposed in the array of pixels of the ultrasonic sensor 200. The scan lines SCL and the sensing lines SSL can be disposed by intersecting each other, and a plurality of pixels can be disposed in an area defined by intersecting of the scan lines SCL and the sensing lines SSL.

In addition, a voltage line can be disposed for supplying a driving voltage DV, a sensing voltage SV, or the like for ultrasonic wave generating and sensing in the array of pixels.

The ultrasonic sensor 200 can include a circuitry for driving the plurality of scan lines disposed in the array of pixels, a circuitry for detecting sensing signals through the plurality of sensing lines, or the like.

Each pixel of the array of pixels may include several circuit elements for ultrasonic wave generating and sensing.

For example, each pixel may include a first transistor T1 and a second transistor T2 controlled by one or more scan signals SCO applied to one or more scan lines SCL, a third transistor T3 controlled by a voltage in a first node N1, and one capacitor C. The capacitor may further include a first electrode, piezoelectric material, and a second electrode. In some other contexts, a reference to a pixel may not include the piezoelectric material or the second electrode.

Here, all of the first transistor T1, the second transistor, and the third transistor T3 represent n-type transistors, but embodiments of the present disclosure are not limited thereto. For example, the first transistor T1, the second transistor, and the third transistor T3 may be implemented by p-type transistors. As another example, the first transistor T1 and the second transistor may be implemented by an identical type, but the third transistor T3 may be implemented by a different type.

A first transistor T1 is controlled by the scan signal SCO applied to the scan line SCL, and electrically connected between a first driving voltage line DVL1 and the first node N1.

The first driving voltage line DVL1 can supply a first driving voltage DV1 for generating ultrasonic waves to the array of pixels. Such first driving voltage DV1 may be an AC voltage with a high voltage level in the form of pulse, for example, an AC voltage swinging between +100V and −100V.

The second transistor T2 is controlled by the scan signal SCO applied to the scan line SCL, and electrically connected between the sensing line SSL and the third transistor T3.

The first transistor T1 and the second transistor T2, which are disposed in pixels adjacent to each other, can be driven by an identical scan line SCL.

That is, as shown in FIG. 2, the first transistor T1 disposed in an A column and the second transistor T2 disposed in a B column are connected to an identical n-th scan line SCL(n), and may be simultaneously driven by an n-th scan signal SCO(n) applied to the n-th scan line SCL(n).

The third transistor T3 may be controlled by a voltage level in the first node N1, and can be electrically connected between a sensing voltage line SVL and the second transistor T2.

A sensing voltage SV applied to the sensing voltage line SVL may be a constant voltage.

The capacitor C can be electrically connected between the first node N1 and a second driving voltage line DVL2.

That is, one electrode of the capacitor C connected to the first node N1 may mean the first electrode E1 for forming the capacitance disposed in the array of thin film transistors 221 described above, and the other electrode of the capacitor C connected to the second driving voltage line DVL2 may mean the second electrode E2.

The second electrode E2 may be an electrode commonly connected to at least two pixels.

The second driving voltage line DVL2 can supply a second driving voltage DV2 for generating ultrasonic waves to one or more pixels, and the second driving voltage DV2 may be a substantially constant voltage (e.g., a DC voltage) lower than the maximum voltage of the first driving voltage DV1.

The scan signal SCO is sequentially applied to the scan lines SCL disposed in the array of pixels; thus ultrasonic waves can be generated and sensing can be performed.

For example, when the n-th scan signal SCO(n) (e.g., with a level capable of turning on the first transistor) is applied to the n-th scan line SCL(n), the first transistor T1 disposed in the A column becomes turned on.

Since the first transistor T1 is turned on, a first driving voltage DV1 is applied to the first node N1.

Since a high voltage in the form of pulse and a low constant voltage are applied to both electrodes of the capacitor C, the piezoelectric material 224 disposed between electrodes of the capacitor C can vibrate and thus ultrasonic waves can be generated.

That is, ultrasonic waves are generated in the A column in which the first transistor T1 is turned on.

At this time, since the n-th scan signal SCO(n) with a level capable of turning on the first transistor is applied to the n-th scan line SCL(n), the second transistor T2 disposed in the B column becomes turned on.

In a situation where the first transistor T1 disposed in the B column is turned off, when ultrasonic waves reflected from a fingerprint reach the B column, a voltage level in the first node N1 of a pixel disposed in the B column can be changed. That is, the polarization state of the piezoelectric material 224 disposed between the first electrode E1 and the second electrode E2 can be changed by the reflected ultrasonic waves, and thus a voltage level of the first electrode E1, i.e. the first node N1 can be changed.

As the voltage level of the first node N1 is changed, the third transistor T3 becomes turned on or off, and if the second transistor T2 is turned on, a sensing voltage SV can be detected through the sensing line SSL.

That is, reflected ultrasonic waves can be sensed in the B column in which the second transistor T2 is turned on.

Thus, since the first transistor T1 and the second transistor T2 disposed in pixel columns adjacent to each other are driven by the identical scan line SCL, generating and sensing of ultrasonic waves can be performed in adjacent pixel columns.

At this time, as the first driving voltage DV1 that is a high voltage for generating ultrasonic waves is supplied to the array of thin film transistors 221, the high voltage may cause transistors, or the like disposed in the array of thin film transistors 221 to be degraded.

In accordance with embodiments of the present disclosure, a method and a device are provided for applying a high voltage and a low voltage for generating ultrasonic waves by vibrating the piezoelectric material 224 and for reducing the degradation of the array of thin film transistors 221.

Figure 3:
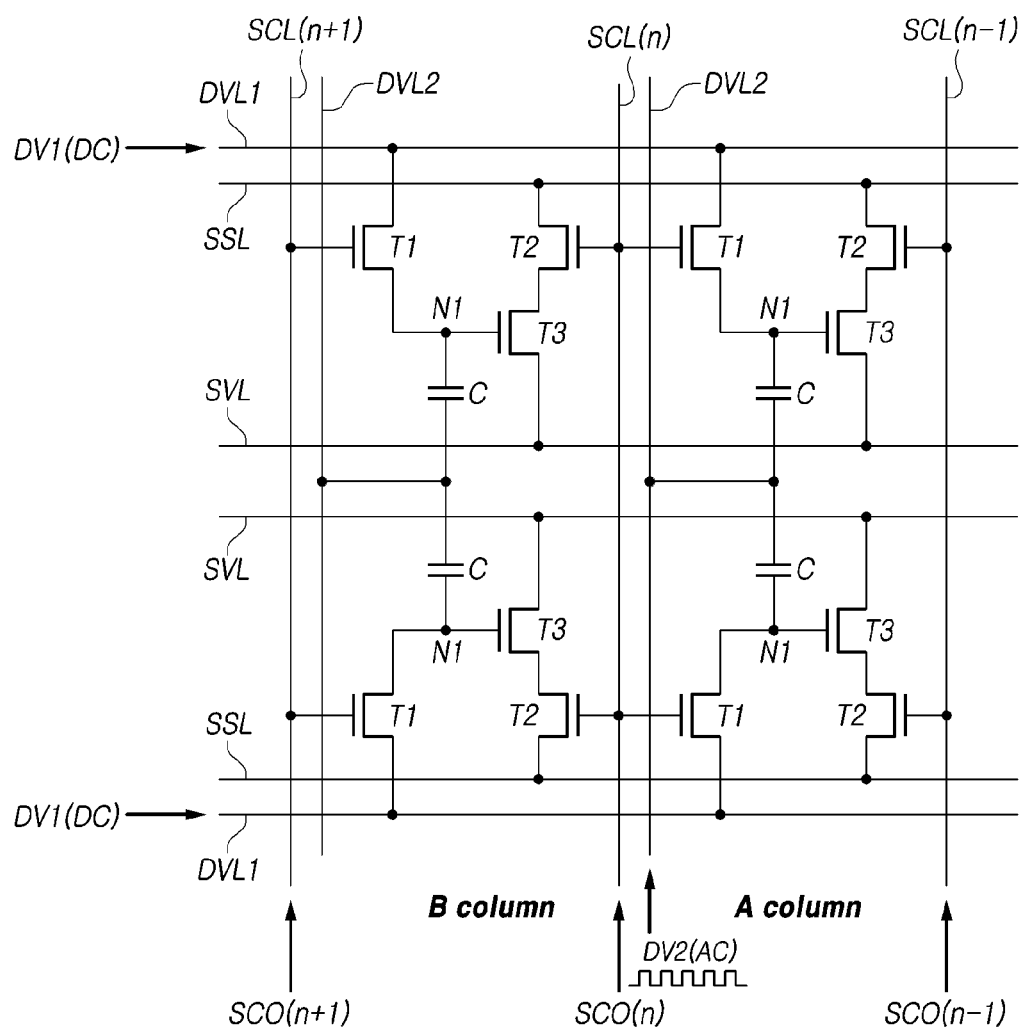
FIG. 3 is a diagram illustrating another a circuit structure and a driving scheme of the array of pixels of the ultrasonic sensor according to an embodiment of the present disclosure.

FIG. 3 is a diagram illustrating a circuit structure and a driving scheme of the array of pixels of the ultrasonic sensor 200 according to an embodiment of the present disclosure.

Referring to FIG. 3, a plurality of scan lines SCL and a plurality of sensing lines SSL which intersect each other can be disposed in the array of pixels of the ultrasonic sensor 200. A plurality of pixels can be disposed in an area defined by the scan lines SCL and the sensing lines SSL.

Each pixel can include a first transistor T1 and a second transistor T2 controlled by scan signals SCO applied to the scan lines SCL, a third transistor T3 controlled by a voltage in a first node N1, and a capacitor C including a first electrode E1 and a second electrode E2.

The gate electrode of the first transistor T1 is electrically connected to the scan line SCL, and electrically connected between a first driving voltage line DVL1 and the first node N1.

The gate electrode of the second transistor T2 is electrically connected to the scan line SCL, and electrically connected between the sensing line SSL and the third transistor T3.

The first transistor T1 and the second transistor T2, which are disposed in pixels adjacent to each other, can be connected to the identical scan line SCL. The first transistor T1 and the second transistor T2 can be driven substantially simultaneously by a scan signal SCO applied to the identical scan signal SCL.

The third transistor T3 may be controlled by a voltage level in the first node N1, and can be electrically connected between a sensing voltage line SVL and the second transistor T2.

In the array of pixels, during an interval in which ultrasonic wave generating and sensing are performed, a scan signal SCO with a level capable of turning on the first transistor T1 may be applied to the scan line SCL.

For example, when an n-th scan signal SCO(n) is applied to an n-th scan line SCL(n), the first transistor disposed in an A column may become turned on. Further, the second transistor T2 disposed in a B column may be turned on as well.

Since the first transistor T1 becomes turned on, a first driving voltage DV1 supplied through the first driving voltage line DVL1 is applied to the first node N1 of the pixel disposed in the A column, that is, the first electrode E1. A second driving voltage DV2 may be applied to the second electrode E2.

Here, the first driving voltage DV1 applied to the first electrode E1 may be a constant voltage (e.g., a DC voltage). The second driving voltage DV2 applied to the second electrode E2 may be an AC voltage whose maximum voltage is greater than the first driving voltage DV1.

That is, a low constant voltage may be applied to the first electrode E1, and a high voltage in the form of pulse may be applied to the second electrode E2. In some embodiments, a first driving voltage DV1 in the form of pulse, amplitude of which is smaller than that of the second driving voltage DV2, may be applied to the first electrode E1.

Since the low constant voltage and the high voltage in the form of pulse are applied to both electrodes forming the capacitor C, the piezoelectric material 224 disposed between the first and second electrodes E1 and E2 can vibrate and thus ultrasonic waves can be generated from the pixel disposed in the A column.

Further, since the second transistor T2 disposed in the B column is turned on, as a voltage in the first node is changed by reflected ultrasonic waves, the third transistor T3 is turned on or off, and thus a sensing voltage SV can be detected through the sensing line SSL.

Accordingly, one or more pixel columns can be sequentially driven by the scan signal SCO applied through one or more scan lines SCL, and as a result, ultrasonic wave generating and sensing can be performed.

Like this, in the array of pixels, the constant voltage with a low level is applied to the first electrode E1 disposed in the array of thin film transistors 221, and the AC voltage with a high level is applied to the second electrode E2 disposed over the piezoelectric material 224; therefore, the piezoelectric material 224 can vibrate and sensing can be performed.

Further, a low voltage is applied to the first electrode E1 disposed in the array of thin film transistors 221; therefore, it is unnecessary for a high voltage to be applied to the array of thin film transistors 221 in order to perform sensing.

Accordingly, in the process of sensing ultrasonic waves, since a high voltage is not applied to the array of thin film transistors 221, it is possible to reduce or overcome the degradation of circuit elements disposed in the array of thin film transistors 221 and improve the reliability, operability and/or lifetime of the circuit elements.

Since a high voltage in the form of pulse is applied to the second electrode E2, such ultrasonic sensor 200 can include the second electrode E2 with a patterned structure for sequentially driving pixel columns.

Figure 4:
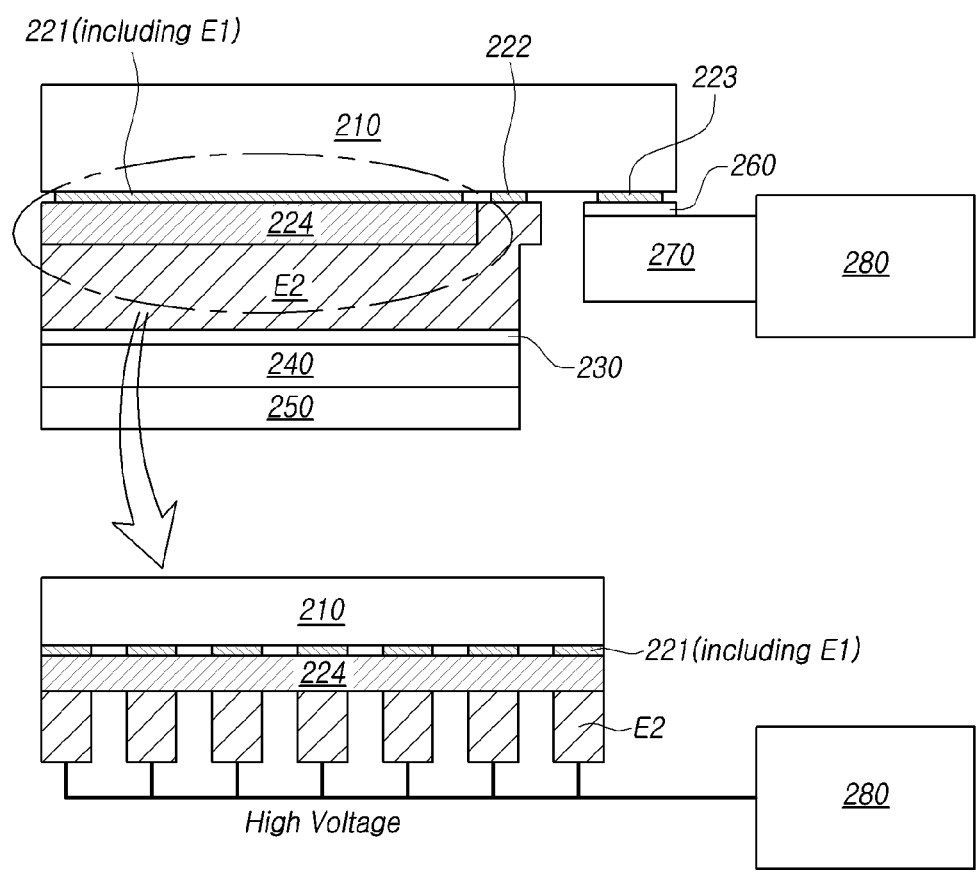
FIG. 4 is a diagram illustrating a sectional structure of the ultrasonic sensor according to an embodiment of the present disclosure.

FIG. 4 is a diagram illustrating a sectional structure of the ultrasonic sensor 200 according to an embodiment of the present disclosure.

Referring to FIG. 4, the ultrasonic sensor 200 can include a substrate 210, an array of thin film transistors 221 disposed over the substrate 210, a first pad 222, and a second pad 223. The array of thin film transistors 221 can include a first electrode E1 to which a first driving voltage DV1 is applied, and a piezoelectric material 224 and a second electrode E2 can be sequentially disposed on the array of thin film transistors 221.

The second electrode E2 can be adhered to a reflective layer 240 through an adhesive layer 230, and a passivation layer 250 can be disposed on the reflective layer 240.

A controller 280 supplying a signal, a voltage, or the like to the array of thin film transistors 221, the second electrode E2, or the like can be electrically connected to a second pad 223 disposed on the substrate 210 through a flexible printed circuit 270 and a conductive bond 260.

The second electrode E2 can be disposed in the form of a plurality of divided second electrodes, each of which corresponds to a pixel column or a pixel row (e.g., see the lower diagram in FIG. 4). Alternatively, in some embodiments, the second electrode E2 may be disposed to correspond to one or more pixels disposed in the array of thin film transistors 221.

For example, the second electrode E2 may be disposed in a direction in which the plurality of scan lines disposed in the array of thin film transistors 221 is disposed, and each of the divided second electrodes can be disposed to correspond to each scan line SCL.

That is, in a situation where the array of thin film transistors 221 has a structure in which each scan line SCL is disposed in each pixel column, each of the divided second electrodes E2 may be disposed to correspond to a pixel column including the first electrode E1 to which the first driving voltage DV1 is applied according to controlling of the scan line SCL.

Here, the array of thin film transistors 221 shown in the example of FIG. 4 represents a structure in which the pixel column including the first electrode E1 has divided portions that correspond to the divided second electrode E2; however, this does not require the array of thin film transistors 221 to have divided portions.

A second driving voltage DV2 with a high level in the form of pulse may be applied to the second electrode E2, and a low constant voltage may be applied to the first electrode E1 disposed in a pixel column corresponding to the divided second electrode E2.

The second driving voltage DV2 may be sequentially applied to the divided second electrodes E2.

That is, as a scan signal is sequentially applied to the scan lines SCL disposed in the array of thin film transistors 221, the first driving voltage DV1 is applied to the first electrode E1 disposed in the array of thin film transistors 221. At this time, the first driving voltage may be sequentially applied on a pixel column basis.

In addition, the second driving voltage DV2 is sequentially applied to the divided second electrodes E2 disposed to correspond to pixel columns; therefore, the piezoelectric material 224 disposed between the first electrode E1 to which the low constant voltage is applied and the second electrode E2 to which the high voltage in the form of pulse is applied can vibrate and thus ultrasonic waves can be generated.

Accordingly, since a high voltage for generating ultrasonic waves is applied to the second electrode E2 other than the first electrode E1 disposed in the array of thin film transistors 221, therefore, it is possible to reduce the degradation of the array of thin film transistors 221.

In addition, since the second electrode E2 is disposed in the form of a plurality of divided second electrodes resulted from patterning, ultrasonic wave generating and sensing may be performed based on a pixel column of the array of thin film transistors 221.

A high voltage is applied to the second electrode E2 in such ultrasonic sensor 200; therefore, the second electrode E2 may be directly electrically connected to the controller 280 outputting a high driving voltage.

Figure 5:
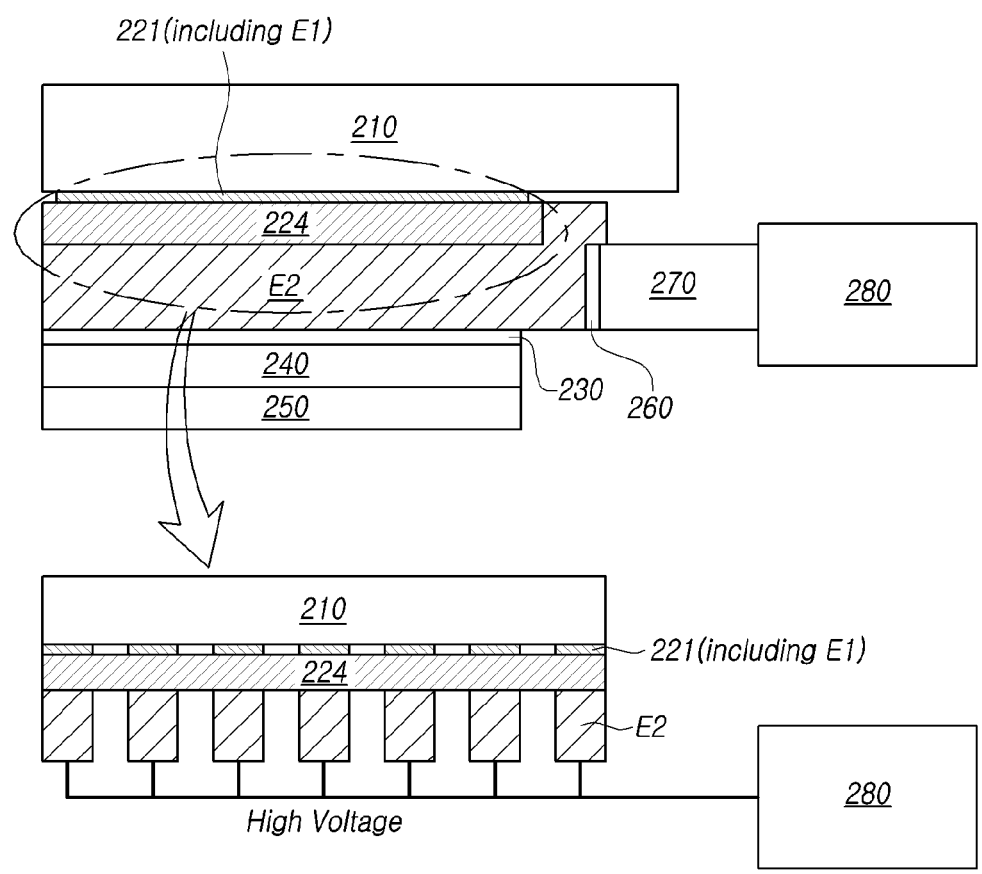
FIG. 5 is a diagram illustrating another sectional structure of the ultrasonic sensor according to an embodiment of the present disclosure.

FIG. 5 is a diagram illustrating another sectional structure of the ultrasonic sensor 200 according to an embodiment of the present disclosure.

Referring to FIG. 5, the ultrasonic sensor 200 can include a substrate 210, an array of thin film transistors 221 disposed over the substrate 210. The array of thin film transistors 221 can include a first electrode E1, and a piezoelectric material 224 and a second electrode E2 can be sequentially disposed on the array of thin film transistors 221.

The second electrode E2 can be adhered to a reflective layer 240 through an adhesive layer 230, and a passivation layer 250 can be disposed on the reflective layer 240.

A controller 280 supplying a second driving voltage DV2 with a high level to the second electrode E2 can be electrically connected to the second electrode E2 through a flexible printed circuit 270 and a conductive bond 260.

That is, the controller 280 can be directly electrically connected to the second electrode E2, or be electrically connected to the second electrode E2 through a connection unit which is not connected to the substrate 210.

Accordingly, the second driving voltage DV2 outputted from the controller 280, that is, a high voltage, can be supplied to the second electrode E2 without passing through the array of thin film transistors 221. Since the high voltage is not supplied to the array of thin film transistors 221, it therefore is possible to reduce further the degradation of the array of thin film transistors 221.

In addition, since the second electrode E2 and the controller 280 are directly electrically connected; it is therefore possible to remove a pad (e.g., pad 222 and 223 as shown in FIG. 4) disposed in the array of thin film transistors 221 and increase a sensing area in the array of thin film transistors 221 due to removing the pad.

At this time, a signal or voltage with a low voltage level is supplied to the array of thin film transistors 221, and can be outputted from a driving circuit included in a device including the ultrasonic sensor 200, such as the display device.

Like this, a high voltage is applied to the patterned second electrode E2, that is, second electrode E2 in the form of multiple divided electrodes; therefore, it is possible to reduce or prevent the degradation of the array of thin film transistors 221 in order to perform ultrasonic wave generating and sensing.

In addition, the controller 280 supplying a high voltage to the second electrode E2 is separated from a circuitry supplying signals to the array of thin film transistors 221; it is therefore possible to reduce or prevent further the degradation of the array of thin film transistors 221 and increase the sensing area of the ultrasonic sensor 200.

Figure 6:
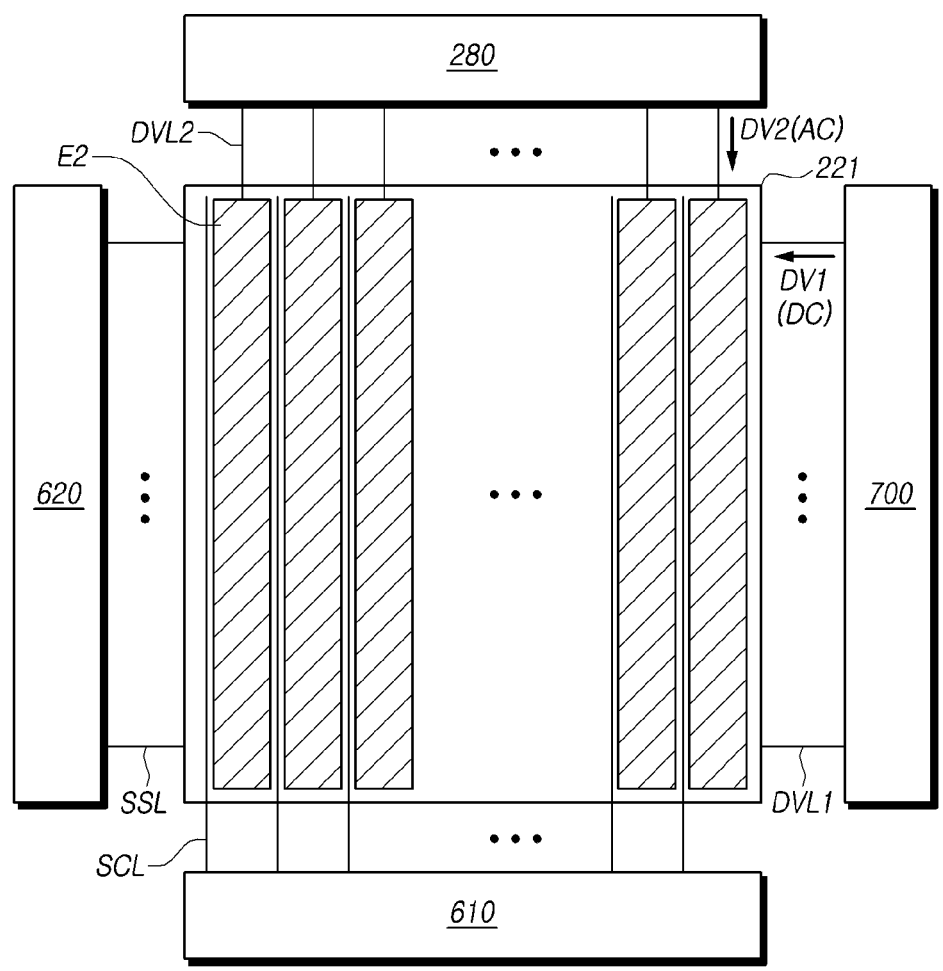
FIG. 6 is a diagram illustrating an ultrasonic sensor structure in which a second electrode is patterned in the ultrasonic sensor shown in FIG. 5, according to an embodiment of the present disclosure.

FIG. 6 is a diagram illustrating an ultrasonic sensor structure in which the second electrode E2 is patterned in the ultrasonic sensor 200 shown in FIG. 5, according to an embodiment of the present disclosure.

Referring to FIG. 6, a plurality of scan lines SCL and a plurality of sensing lines SSL can be disposed in the array of thin film transistors 221 of the ultrasonic sensor 200

The array of thin film transistors 221 can include a scan driving circuit 610 outputting a scan signal SCO to the plurality of scan lines SCL, and a sensing circuit 620 detecting a sensing signal from the plurality of sensing lines SSL.

A first driving voltage line DVL1 supplying a first driving voltage DV1 to a first electrode E1, and a second driving voltage line DVL2 supplying a second driving voltage DV2 to the second electrode E2 can be disposed in the array of thin film transistors 221.

Here, the second electrode E2 can be disposed to correspond to (e.g., be in the direction of, aligned with, or parallel to) a scan line SCL disposed in the array of thin film transistors 221 or a pixel column driven by the scan line.

Accordingly, ultrasonic wave generating and sensing can be performed based on a pixel column of the array of thin film transistors 221.

The second driving voltage DV2 with a high level in the form of pulse outputted from the controller 280 can be applied to the second electrode E2 electrically connected to the controller 280.

At this time, the first electrode E1 disposed in the array of thin film transistors 221 can receive a signal or a voltage etc. from a separate circuitry other than the controller 280. For example, the first electrode E1 can receive various signals and voltages from a display driving circuit 700 of the display device including the ultrasonic sensor 200.

Accordingly, the high voltage outputted from the controller 280 is not applied to the array of thin film transistors 221, and supplied to only the second electrode E2; it is therefore possible to reduce or prevent the degradation of the array of thin film transistors 221 of the ultrasonic sensor 200 performing ultrasonic wave generating and sensing by applying a high voltage in the form of pulse.

Further, since the degradation of circuit elements disposed in the array of thin film transistors 221 is prevented, it is therefore possible to improve the reliability and lifetime of the circuit elements and provide sensing functionality.

Figure 7:
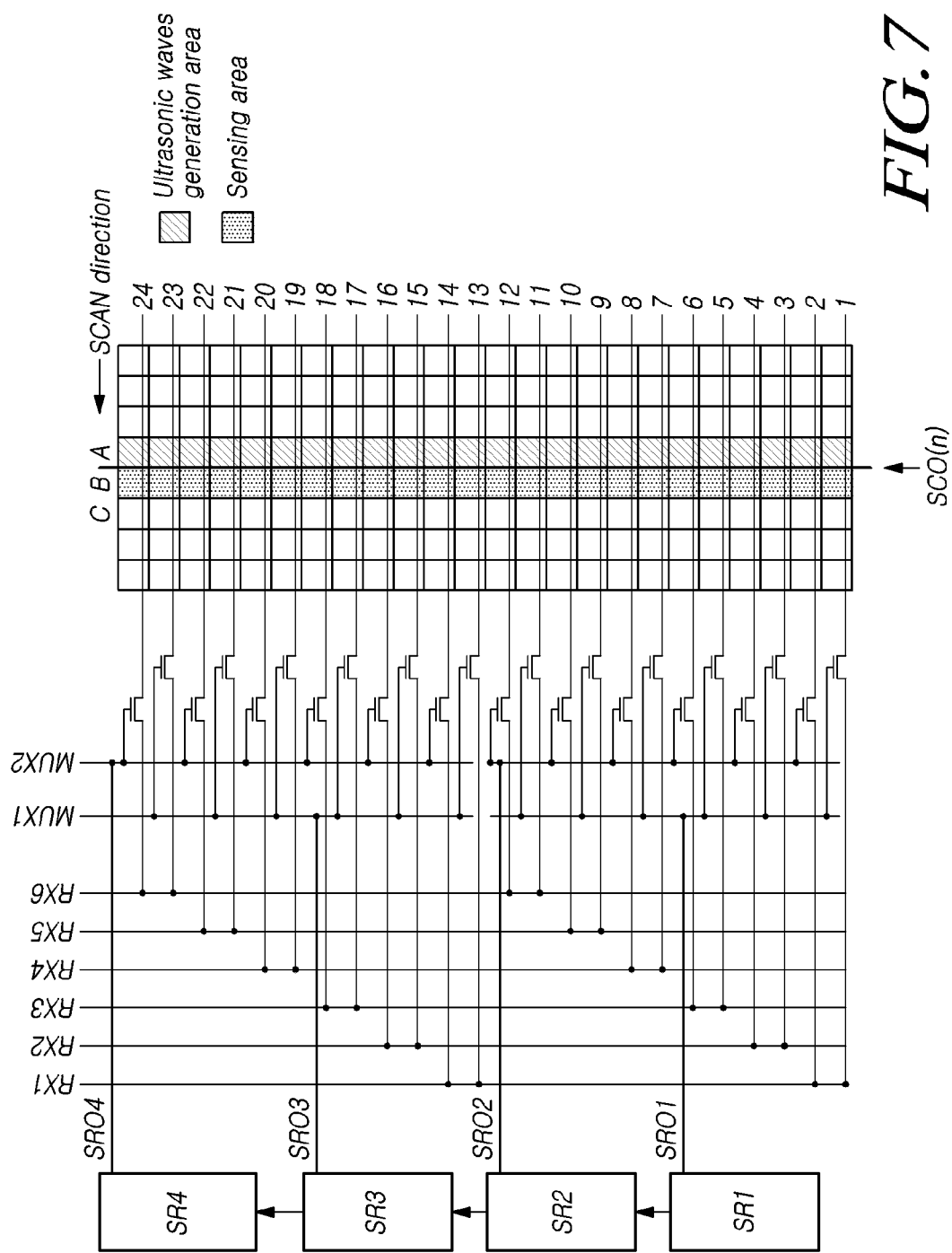
FIG. 7 is a diagram illustrating a sensing scheme of the ultrasonic sensor shown in FIG. 5, according to an embodiment of the present disclosure.
Figure 8:
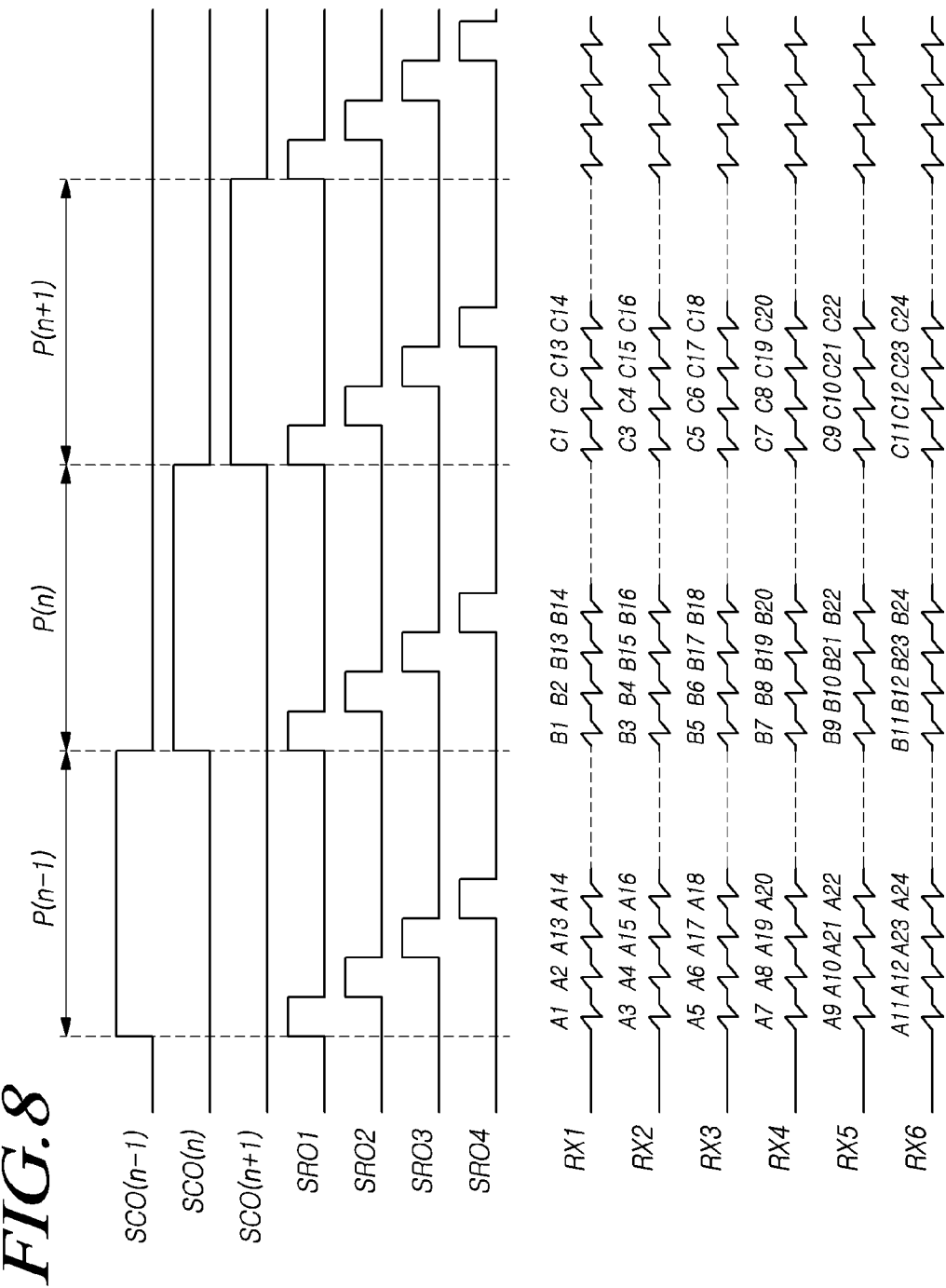
FIG. 8 is a timing chart illustrating sensing timing of the ultrasonic sensor shown in FIG. 5, according to an embodiment of the present disclosure.

FIG. 7 is a diagram illustrating a sensing scheme of the ultrasonic sensor 200 shown in FIG. 5, according to an embodiment of the present disclosure. FIG. 8 is a timing chart illustrating sensing timing of the ultrasonic sensor 200 shown in FIG. 5, according to an embodiment of the present disclosure.

As previously described in the ultrasonic sensor 200, a scan signal SCO can be sequentially applied to a plurality of scan lines SCL disposed in the array of pixels, and a second driving voltage DV2 with a high level in the form of pulse can be applied to a second electrode E2 disposed to correspond to a pixel column. Therefore, ultrasonic waves can be generated on a pixel column basis. In addition, reflected ultrasonic waves can be sensed in a pixel column adjacent to a pixel column generating ultrasonic waves.

Pixels disposed in such an array of pixels can be connected to a sensing circuit 620 on a pixel row basis, and transmit sensing signals by being connected to the sensing circuit 620 through a multiplexer MUX controlled by a shift register signal SRO outputted from a shift register SR.

Referring to FIG. 7 for example, ultrasonic waves can be generated from a pixel disposed in an A column (e.g., by a scan signal SCO applied to a scan line SCL). In addition, reflected ultrasonic waves can be sensed in a B column adjacent to the A column.

At this time, when a first multiplexer MUX1 becomes turned on by a shift register signal SRO outputted from the shift register SR, sensing signals can be transmitted from pixels disposed in odd-numbered row(s) of the B column to the sensing circuit 620 through at least one reception line RX.

When a second multiplexer MUX2 become turned on by a shift register signal SRO, sensing signals can be transmitted from pixels disposed in even-numbered row(s) of the B column to the sensing circuit 620 through at least one reception line RX.

Referring to FIG. 8, an (n−1)th scan signal SCO(n−1) with a level capable of turning on a first transistor T1 disposed in a pixel column previous to the A column may be outputted in a P(n−1) interval. Accordingly, ultrasonic waves are generated in the pixel column previous to the A column, and a second transistor T2 disposed in the A column becomes turned on, and thus sensing can be performed in the A column.

In the P(n−1) interval, the shift register SR sequentially outputs shift register signals SRO, and thus the first multiplexer MUX1 and the second multiplexer MUX2 can become turned on alternately.

During an interval in which the first multiplexer MUX1 is turned on, sensing signals can be detected from pixels (A1, A3, A5, A7, . . . , A21, A23) disposed in odd-numbered row(s) of the A column. During an interval in which the second multiplexer MUX2 is turned on, sensing signals can be detected from pixels (A2, A4, A6, A8, . . . , A22, A24) disposed in even-numbered row(s) of the A column.

In a P(n) interval, an (n−1)th scan signal SCO(n−1) remains with a level capable of turning off the first transistor T1, and an n-th scan signal SCO(n) is supplied with the level capable of turning on a first transistor T1.

Accordingly, ultrasonic waves can be generated in the A column, and sensing can be performed for ultrasonic waves reflected from the B column which is adjacent to the A column and in which a second transistor T2 becomes turned on by the n-th scan signal SCO(n).

Likewise, during the interval in which the first multiplexer MUX1 is turned on by a shift register signal SRO outputted from the shift register SR, sensing signals can be detected from pixels (B1, B3, B5, B7, . . . , B21, B23) disposed in odd-numbered row(s) of the B column. During an interval in which the second multiplexer MUX2 is turned on, sensing signals can be detected from pixels (B2, B4, B6, B8, . . . , B22, B24) disposed in even-numbered row(s) of the B column.

Like this, in the array of pixels of the ultrasonic sensor 200, scan lines SCL can be sequentially driven, and a high voltage is sequentially supplied to second electrodes E2 patterned to correspond to pixel columns driven by the scan lines SCL; therefore, ultrasonic wave generating and sensing can be performed by sequentially driving the pixel columns.

Figure 9:
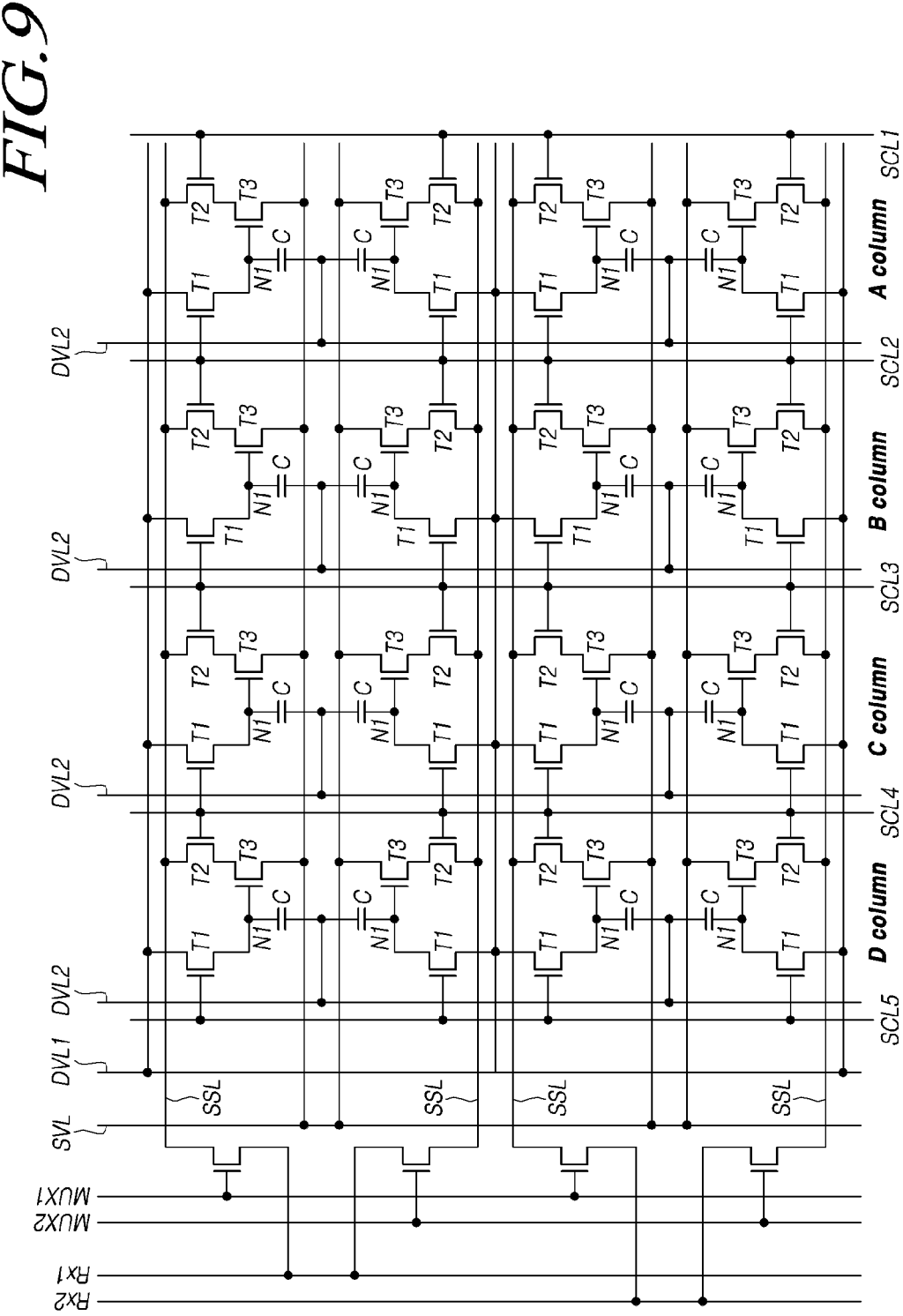
FIG. 9 is a diagram illustrating a circuit structure of the array of pixels of the ultrasonic sensor shown in FIG. 5, according to an embodiment of the present disclosure.

FIG. 9 is a diagram illustrating a circuit structure of the array of pixels of the ultrasonic sensor 200 shown in FIG. 5, according to an embodiment of the present disclosure.

Referring to FIG. 9, a plurality of scan lines SCL and a plurality of sensing lines SSL which intersect each other can be disposed in the array of pixels of the ultrasonic sensor 200

Each pixel disposed in an area defined by intersecting of the sensing lines SSL and the scan lines SCL can include a first transistor T1, a second transistor T2, a third transistor T3, and a capacitor C including a first electrode E1 and a second electrode E2.

A sensing voltage line SVL connected to the third transistor T3, a first driving voltage line DVL1 supplying a first driving voltage DV1, and a second driving voltage line DVL2 supplying a second driving voltage DV2 can be disposed in the array of pixels.

Here, the second driving voltage line DVL2 is disposed in a direction identical to a direction in which at least one scan line is disposed, and can be electrically connected to the second electrode E2 of the capacitor C disposed in an identical pixel column.

That is, the second electrode E2 is disposed in the form of a plurality of divided electrodes resulted from the patterning thereof, each of which corresponds to a scan line SCL or a pixel column driven by the scan line SCL; therefore, it can be seen that the second driving voltage line DVL2 in the array of pixels is disposed in a direction identical to a direction in which the at least one scan line is disposed.

Further, the controller 280 sequentially outputs a second driving voltage DV2 to second driving voltage lines DVL2 in accordance with a timing at which a scan signal SCO is applied to the scan lines SCL; therefore, ultrasonic waves can be generated by the first driving voltage DV1 with a low constant voltage and the second driving voltage DV2 with a high voltage in the form of pulse.

Figure 10:
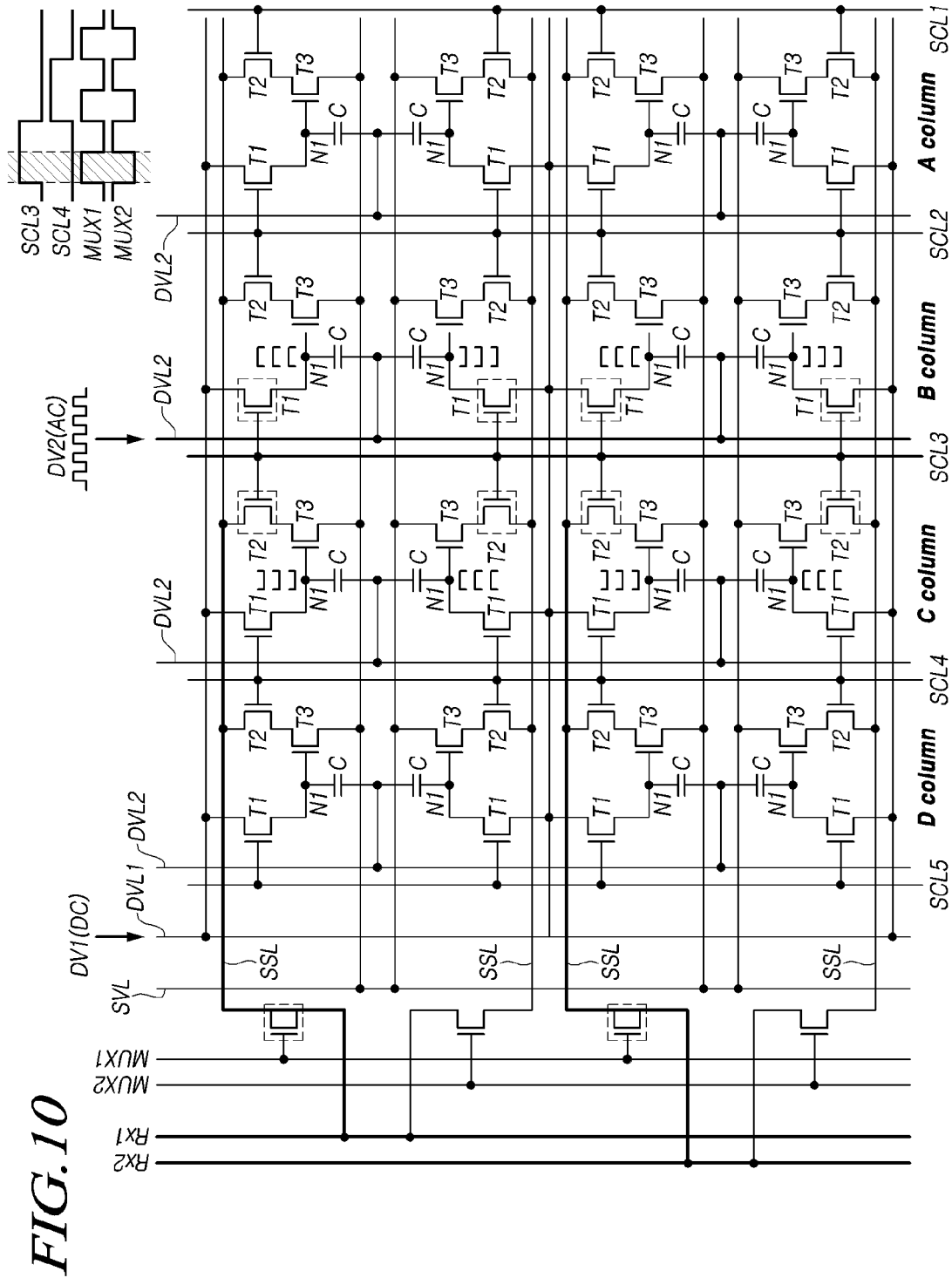
FIGS. 10 and 11 are diagrams illustrating sensing schemes performed in the circuit structure shown in FIG. 9, according to embodiments of the present disclosure.
Figure 11:
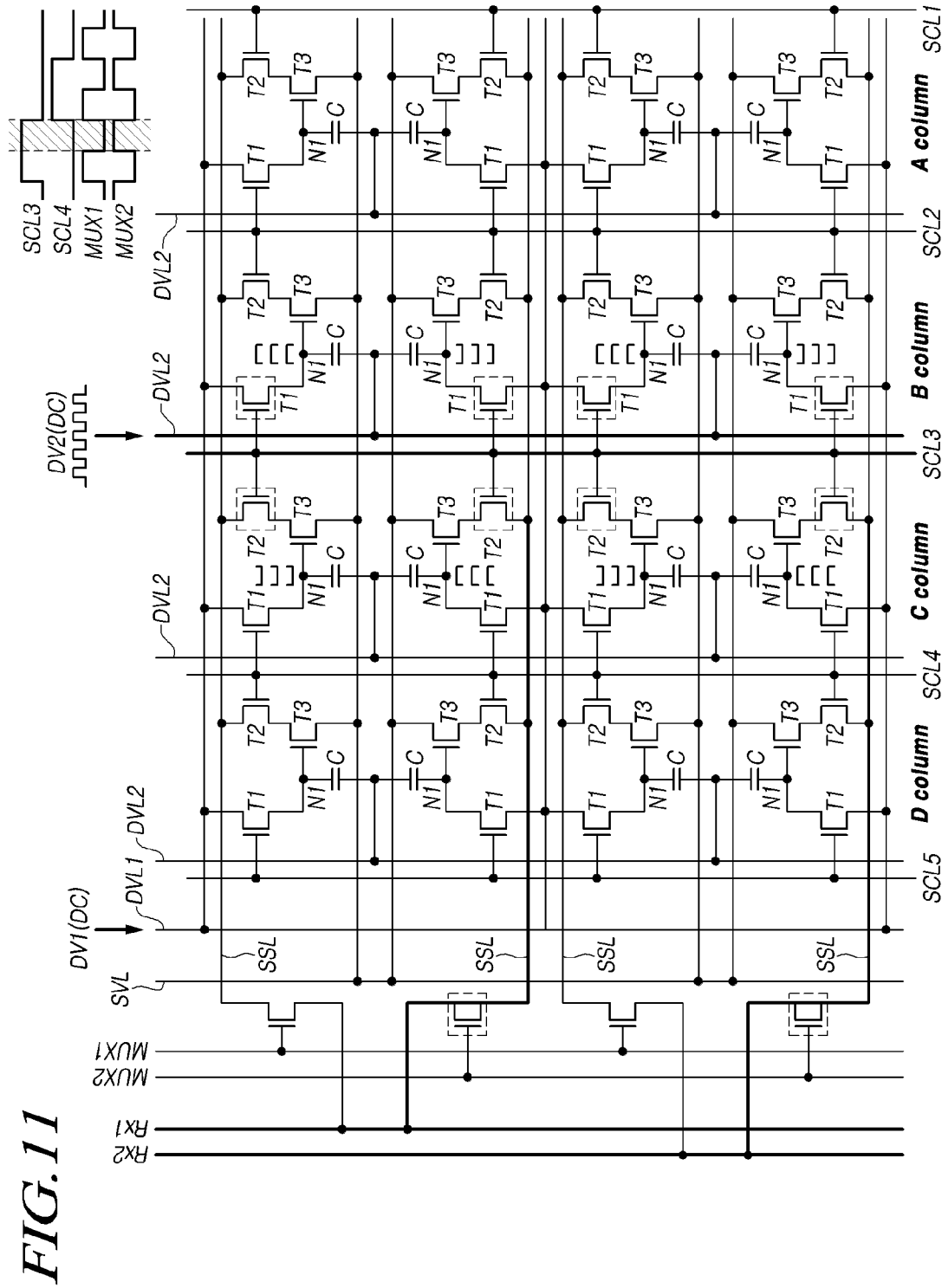

FIGS. 10 and 11 are diagrams illustrating sensing schemes performed in the circuit structure shown in FIG. 9.

FIGS. 10 and 11 represent an interval in which a third scan signal SCO3 with a level capable of turning on a first transistor T1 is applied to a third scan line SCL3.

When the third scan signal SCO3 is applied to the third scan line SCL3, a first transistor T1 disposed in a B column becomes turned on, and a first driving voltage DV1 with a low constant voltage is applied to a first node, that is, a first electrode E1.

In an interval in which the first driving voltage DV1 is applied to the first electrode E1 disposed in the B column, a second driving voltage DV2 with a high level in the form of pulse can be applied to a second driving voltage line DVL2 connected to a second electrode E2 disposed in the B column.

Here, a controller 280 supplying the second driving voltage DV2 may only output the second driving voltage DV2 to a second driving voltage line DVL2 disposed in B column.

Accordingly, a piezoelectric material 224 can vibrate by voltages applied to the first electrode E1 and the second electrode E2, which are disposed in the B column, and thus ultrasonic waves can be generated.

That is, even when a high voltage is not applied to the array of thin film transistors 221 in which circuit elements etc. are disposed in the array of pixels, ultrasonic waves can be generated based on a pixel column.

During an interval in which ultrasonic waves are generated in the B column, a second transistor T2 disposed in a C column becomes turned on by the third scan signal SCO3 applied to the third scan line SCL3. Accordingly, when a voltage level of a first node N1 included in a pixel disposed in the C column is changed by reflected ultrasonic waves, a third transistor T3 becomes turned on or off, and a sensing voltage SV can be detected through a sensing line SSL.

As shown in FIG. 10, in a situation where a first multiplexer MUX1 is turned on, sensing signals detected through second transistors T2 of pixels disposed in odd-numbered rows of the C column may be transmitted to a sensing circuit 620 through at least one reception line RX.

As shown in FIG. 11, in a situation where a second multiplexer MUX2 is turned on, sensing signals detected through second transistors T2 of pixels disposed in even-numbered rows of the C column may be transmitted to a sensing circuit 620 through at least one reception line RX.

Likewise, a second driving voltage DV2 with a high level in the form of pulse is sequentially applied to the second electrodes E2 in accordance with sequential driving of scan lines SCO, and ultrasonic wave generating and sensing can be performed in the C column, a D column, etc.

Figure 12:
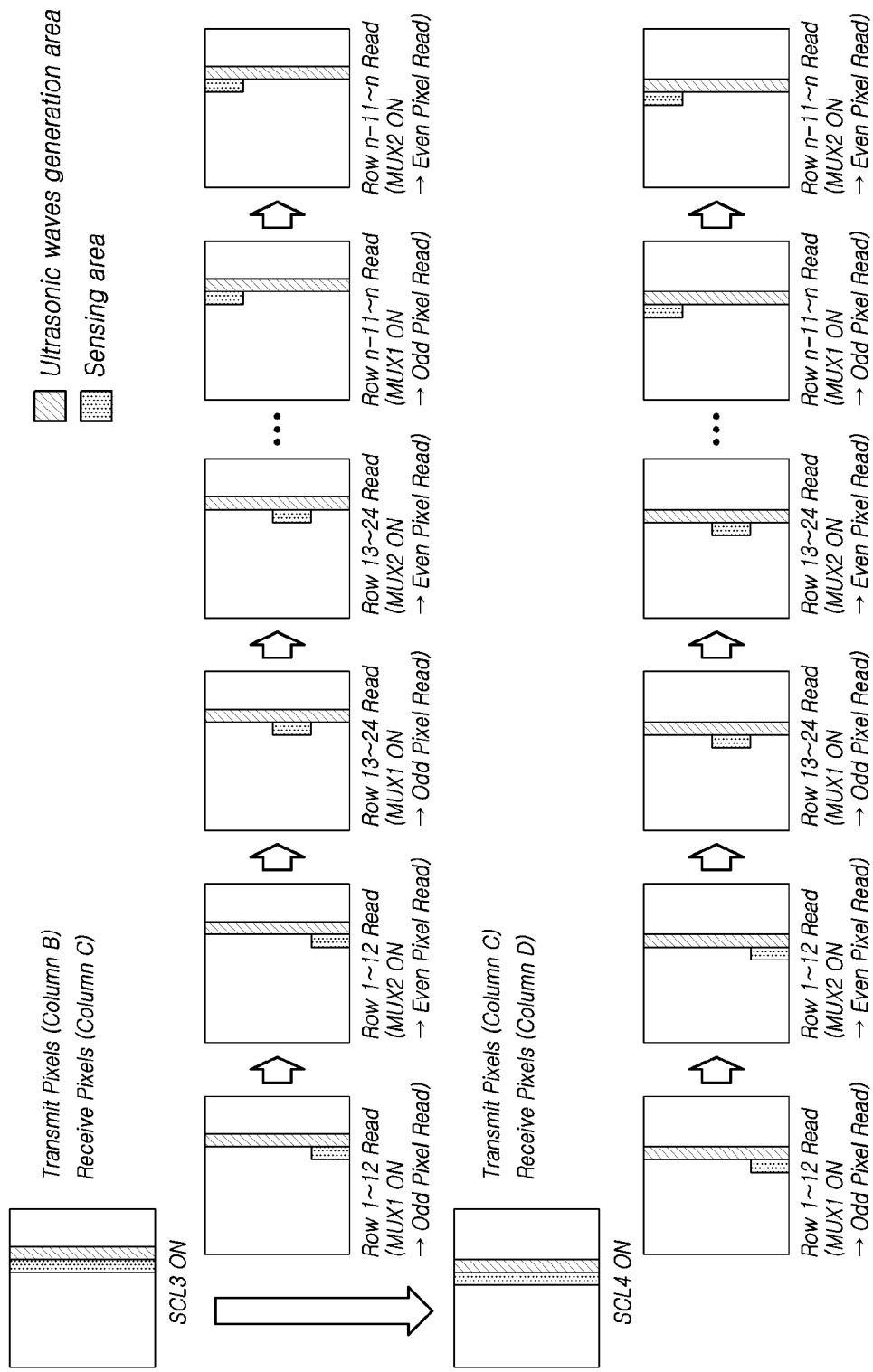
FIG. 12 is a diagram illustrating a sensing process performed by the ultrasonic sensor according to the sensing schemes shown in FIGS. 10 and 11, according to an embodiment of the present disclosure.

FIG. 12 is a diagram illustrating a sensing process performed by the ultrasonic sensor 200 according to the sensing schemes shown in FIGS. 10 and 11, according to an embodiment of the present disclosure.

Referring to FIG. 12, in an interval in which the third scan signal SCO3 with a turn-on level is applied to the third scan line SCL3, ultrasonic waves can be generated from the B column, and sensing can be performed in the C column.

At this time, in a case where sensing is performed by two multiplexers MUX and six reception lines RX, the first multiplexer MUX1 and the second multiplexer MUX2 are turned on alternately, and in an interval in which one multiplexer MUX is turned on, sensing signals from 6 pixels can be detected.

Accordingly, during an interval in which ultrasonic waves are generated in the B column, sensing can be performed on a certain number of pixel rows basis in the C column.

Further, when a fourth scan signal SCO4 with a turn-on level is applied to a fourth scan line SCL4, ultrasonic waves can be generated from the C column, and sensing can be performed in the D column.

Likewise, during an interval in which ultrasonic waves are generated in the C column, the first multiplexer MUX1 and the second multiplexer MUX2 are turned on alternately, and sensing can be performed on a pixel row basis.

Like this, while sensing is performed, since driving voltages should be applied to the first electrode E1 and the second electrode E2 disposed in a pixel column generating ultrasonic waves, a high voltage is continually supplied during the sensing interval.

In accordance with embodiments of the present disclosure, since a pulsed high voltage is applied to the second electrode E2 without passing through the array of thin film transistors 221, the degradation of the array of thin film transistors 221 due to the high voltage applied during a long interval may be reduced. Accordingly, it is possible to improve the reliability and lifetime of circuit elements disposed in the array of thin film transistors 221.

In addition, in accordance with some embodiments of the present disclosure, since the second electrode E2 is patterned (e.g., segmented) and disposed in the patterned structure, and the high voltage in the form of pulse is sequentially supplied, ultrasonic wave generating and sensing can be performed on a pixel column basis.

Further, in accordance with some embodiments of the present disclosure, since the controller 280 supplies a high voltage through driving voltage lines DVL that are directly connected to the second electrode E2, the high voltage outputted from the controller 280 does not pass through the array of thin film transistors 221. Therefore it is possible to reduce or prevent further the degradation of circuit elements, and increase the sensing area due to not requiring an associated pad, or the like.

Although embodiments of the present disclosure have been described for illustrative purposes, those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An ultrasonic sensor comprising:
an array of thin film transistors;
a plurality of first electrodes coupled to the array of thin film transistors;
a piezoelectric material disposed over the array of thin film transistors; and
a plurality of second electrodes disposed over the piezoelectric material,
wherein, in a time interval, a first driving voltage is applied to at least one of the plurality of first electrodes via at least one thin film transistor from the array of thin film transistors and a second driving voltage is applied to at least one of the plurality of second electrodes without the second driving voltage being applied to any thin film transistor from the array of thin film transistors, and
wherein the second driving voltage is an AC (Alternating Current) voltage with a maximum voltage that is greater than a maximum voltage of the first driving voltage.

2. The ultrasonic sensor of claim 1, wherein the first driving voltage is a DC (Direct Current) voltage.

3. The ultrasonic sensor of claim 1, wherein the array of thin film transistors includes a plurality of scan lines, a plurality of sensing lines, and a plurality of pixels, and wherein the plurality of second electrodes are disposed in a direction in which the plurality of scan lines are disposed.

4. The ultrasonic sensor of claim 1, wherein the second driving voltage is sequentially supplied to the plurality of second electrodes.

5. The ultrasonic sensor of claim 1, further comprising a controller directly electrically connected to the plurality of second electrodes or electrically connected to the plurality of second electrodes through a connection unit electrically separated from the array of thin film transistors, the plurality of second electrodes receiving the second driving voltage from the controller.

6. The ultrasonic sensor of claim 5, wherein the plurality of first electrodes receive the first driving voltage from a driving circuit separated from the controller.

7. The ultrasonic sensor of claim 1, wherein the plurality of second electrodes receive the second driving voltage from a controller electrically connected to the plurality of second electrodes through a pad disposed in the array of thin film transistors.

8. The ultrasonic sensor of claim 1, wherein the array of thin film transistors includes a plurality of scan lines, a plurality of sensing lines, and a plurality of pixels, and wherein each of the plurality of pixels comprises:
  a first transistor controlled by a scan signal applied to at least one of the plurality of scan lines, and connected between the at least one of the plurality of first electrodes and a first driving voltage line;
  a second transistor controlled by the scan signal applied to the at least one of the plurality of scan lines, and connected to at least one of the plurality of sensing lines; and
  a third transistor controlled by a voltage level of the at least one of the plurality of first electrodes, and connected between the second transistor and a sensing voltage line,
  wherein the first transistor disposed in an N-th pixel column and the second transistor disposed in an (N+1)-th pixel column are driven by an identical scan line.

9. The ultrasonic sensor of claim 8, wherein each of the plurality of second electrodes receives the second driving voltage in a time interval in which a scan signal with a level capable of turning on the first transistor connected to the at least one of the plurality of first electrodes is applied to the at least one of the plurality of scan lines corresponding to the at least one of the plurality of second electrodes.

10. The ultrasonic sensor of claim 8, wherein the second transistor disposed in the (N+1)th pixel column are turned on in a time interval in which the first transistor disposed in the N-th pixel column is turned on, and turned off in a time interval in which the first transistor disposed in the N-th pixel column is turned off.

11. The ultrasonic sensor of claim 1, wherein the array of thin film transistors includes a plurality of scan lines, a plurality of sensing lines, and a plurality of pixels, and the ultrasonic sensor further comprises:
  a scan driving circuit outputting a scan signal to the plurality of scan lines, and
  a sensing circuit detecting one or more sensing signals through the plurality of sensing lines.

12. The ultrasonic sensor of claim 11, wherein in a time interval in which the scan driving circuit outputs the scan signal to the at least one of the plurality of scan lines with a level capable of turning on transistors connected to at least one of the plurality of scan lines, a controller outputs the second driving voltage to the at least one of the plurality of second electrodes corresponding to the at least one of the plurality of scan lines to which the scan signal is applied.

13. A display device comprising a display panel and the ultrasonic sensor of claim 1.

14. An ultrasonic sensor comprising:
  thin film transistors (TFTs);
  first electrodes coupled to one or more of the TFTs;
  a piezoelectric material coupled to the first electrodes; and
  second electrodes coupled to the piezoelectric material and separated from the TFTs by at least the piezoelectric material,
  wherein a first driving voltage is applied to at least one of the first electrodes through one or more of the TFTs and a second driving voltage is applied to at least one of the second electrodes without the second driving voltage being applied to any of the TFTs, wherein the second driving voltage has an amplitude larger than an amplitude of the first driving voltage.

15. The ultrasonic sensor of claim 14, wherein a pixel of the ultrasonic sensor comprises:
  a first transistor connected to a first electrode of the first electrodes and a driving voltage line, wherein the first driving voltage is applied to the driving voltage line;
  a second transistor connected to a sensing line;
  a third transistor connected to the second transistor and a sensing voltage line; and
  wherein a gate electrode of the third transistor is electrically connected to the first electrode, and,
  wherein a scanning line is electrically connected to a gate electrode of the first transistor and a gate electrode of another second transistor in an adjacent pixel of the ultrasonic sensor.

16. The ultrasonic sensor of claim 14, further comprising:
  a driving circuit that applies the first driving voltage to at least one of the first electrodes through one or more of the TFTs; and
  a controller that is physically distinct from the driving circuit and applies the second driving voltage to the at least one of the second electrodes, wherein the second driving voltage does not pass through the thin film transistors.

17. The ultrasonic sensor of claim 14, wherein the ultrasonic sensor includes an array of pixels, each of the pixels including one or more of the TFTs and one or more of the first electrodes, and wherein the second electrodes are aligned with pixel columns of the array of pixels.

18. The ultrasonic sensor of claim 17, wherein ultrasonic waves are emitted from the piezoelectric material corresponding to a first pixel column of the pixel columns by applying the first driving voltage to one or more first electrodes in the first pixel column and applying the second driving voltage to one or more of the second electrodes aligned with the first pixel column.

19. The ultrasonic sensor of claim 18, wherein while the piezoelectric material corresponding to the pixel column emits ultrasonic waves, the piezoelectric material in an adjacent pixel column detects ultrasonic waves.

20. The ultrasonic sensor of claim 19, wherein a portion of pixels in the adjacent pixel column detect ultrasonic waves during a first period and a second portion of pixels in the adjacent pixel column detect ultrasonic waves during a second period subsequent to the first period.

21. The ultrasonic sensor of claim 14, wherein the first driving voltage is a DC (Direct Current) voltage and the second driving voltage is an AC (Alternating Current) voltage.

* * * * *